United States Patent [19]

Gassinger et al.

[11] 4,152,538
[45] May 1, 1979

[54] PRESSURIZED CABLE TERMINATION SEAL AND METHODS OF MAKING

[75] Inventors: Henry A. Gassinger; Joseph Mariano; Walter Schmitz, all of Baltimore, Md.; Arnold R. Smith, Chester, N.J.

[73] Assignee: Western Electric Company, Incorporated, New York, N.Y.

[21] Appl. No.: 843,607

[22] Filed: Oct. 19, 1977

[51] Int. Cl.$^2$ .......................................... H02G 15/22
[52] U.S. Cl. ...................................... 174/19; 29/628; 174/23 R; 174/76
[58] Field of Search ............... 174/19, 20, 23 R, 23 C, 174/76, 77 R; 29/628

[56] References Cited

U.S. PATENT DOCUMENTS

| | | | |
|---|---|---|---|
| 1,229,995 | 6/1917 | Mainer | 174/76 |
| 2,232,872 | 2/1941 | Seitz | 174/20 X |
| 2,719,876 | 10/1955 | Hennessey et al. | 174/77 R |
| 3,113,284 | 12/1963 | Inthoudt | 338/274 |
| 3,187,081 | 6/1965 | Bollmeier | 174/19 X |
| 3,539,709 | 11/1970 | Brancaleone | 174/75 |
| 3,555,171 | 1/1971 | Larson | 174/138 |
| 3,617,614 | 11/1971 | Henry | 174/77 R |
| 3,829,546 | 8/1974 | Hunter et al. | 264/262 |
| 4,015,329 | 4/1977 | Hutchison | 29/628 |

FOREIGN PATENT DOCUMENTS 1190075  4/1965  Fed. Rep. of Germany ........ 174/77 R

OTHER PUBLICATIONS

Fukutomi, H., Ogawa, K., Egashira, J.-"Prefabricated Pressure Dam for Telephone Cable", pp. 140-144, 20th International Wire and Cable Symposium Proceedings-Nov. 30-Dec. 2, 1971.

Azuma, M., Oishi, Y., Fuse, K., Oda, M.-"Development of Cable with Gasstoppage Dam by Polyethylene Mold Process", pp. 312-315, Proceedings-25th International Wire and Cable Symposium-Nov. 16-18, 1976.

Primary Examiner—Laramie E. Askin
Assistant Examiner—E. F. Borchelt
Attorney, Agent, or Firm—E. W. Somers

[57] ABSTRACT

A seal is used to prevent the escape of gas from a gas pressurized plastic-jacketed, multi-conductor cable where the conductors of an unjacketed portion of the cable enter a cabinet of a terminal which is exposed to temperature cycling. The seal includes a sleeve made of an elastomeric material having one end which engages an end section of the cable jacket with the conductors of the unjacketed portion of the cable extending through the other end of the sleeve into the cabinet. The seal also includes a metallic tube which is disposed about the elastomeric sleeve with one of the end portions of the tube which is aligned with the cable jacket being in compressive engagement with the sleeve and jacket. A plugging compound in the other end portion of the tube and which is compliant with the sleeve material encapsulates the conductors and the other end of the sleeve which extends into the plugging compound. The compliancy of the sleeve and the plugging compound cause them to move together during temperature cycling to avoid the development of leak paths and the escape of gas from the cable.

10 Claims, 6 Drawing Figures

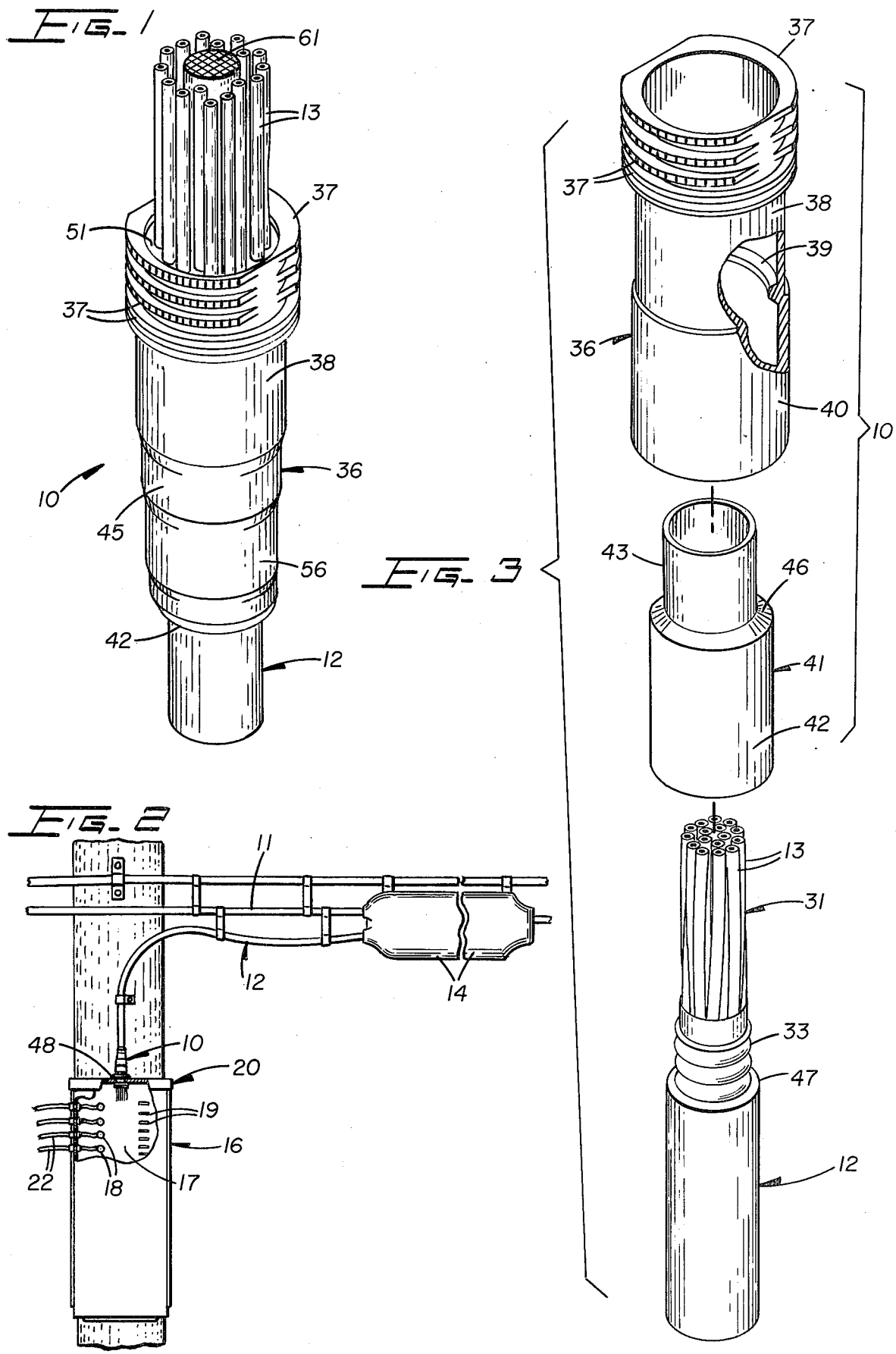

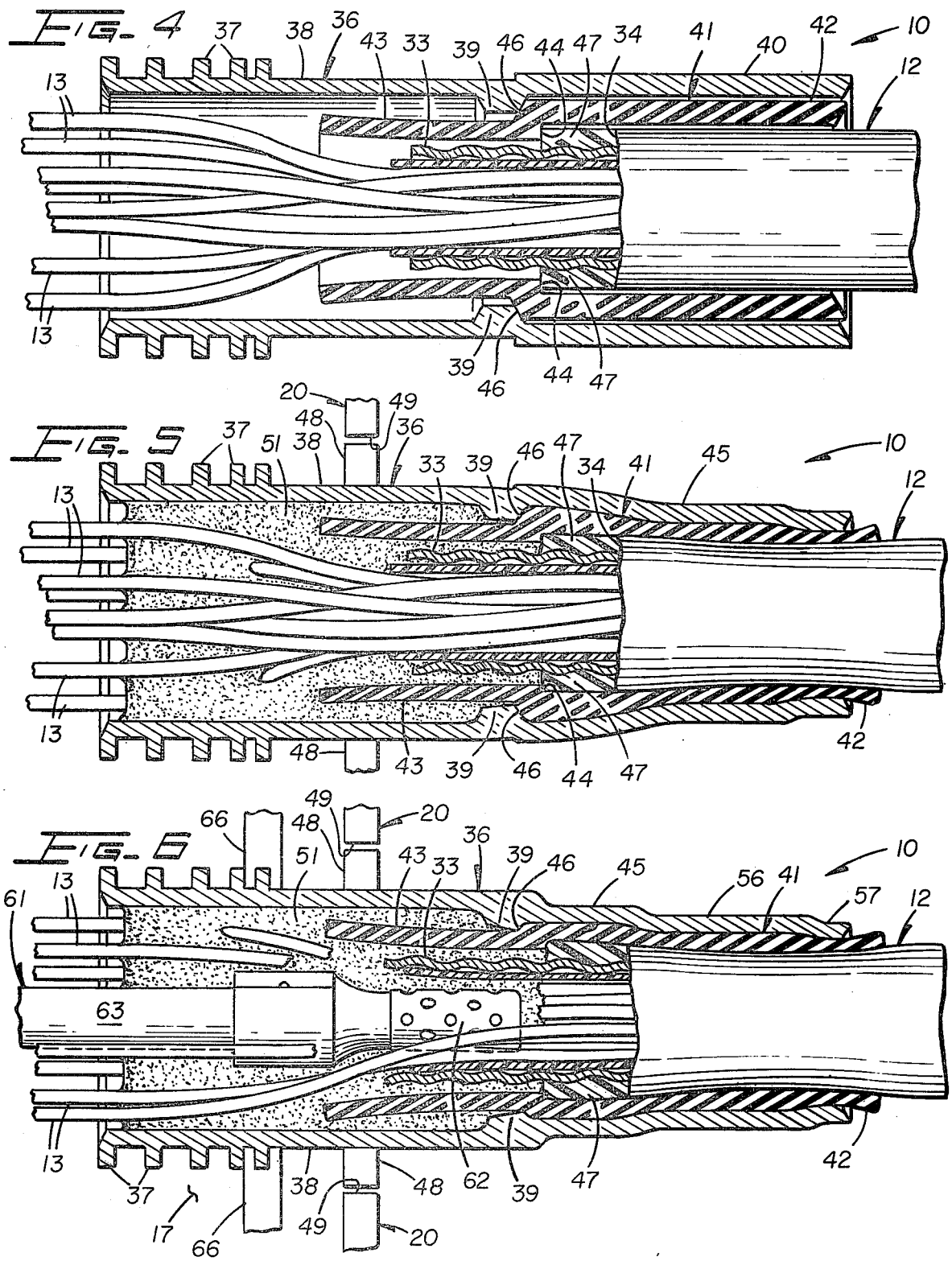

PRESSURIZED CABLE TERMINATION SEAL AND METHODS OF MAKING

BACKGROUND

1. Field of the Invention

This invention relates to a pressurized cable termination seal and methods of making such a seal, and, more particularly, to an end seal for a gas pressurized cable, where the cable is connected to a terminal, to prevent the escape of gas not withstanding the exposure of the end seal to a wide range of temperature cycling.

2. Prior Art

Aerial, pulp-insulated conductor cable which is gas-pressurized to protect the cable against moisture, is connected to a telephone distribution system through a short length of cable which is referred to as stub cable and which includes a plurality of individual plastic-insulated conductors enclosed in a plastic jacket. The distribution system includes a telephone cable terminal which is mounted, for example, on a pole, and which includes a plurality of terminal posts and associated protector units encapsulated in a dielectric block mounted inside a weatherproof cabinet having a plurality of entrance ports for drop wires which are run between the terminal posts and the subscribers' premises.

The short length of stub cable has its jacket removed from an end portion which extends through a metal nipple that is supported in an opening in the cabinet. A portion of the nipple on the exterior of the cabinet engages the outwardly facing surface of an end section of the stub cable jacket which, in general, is a plastic material. A portion of the nipple is crimped about the stub cable jacket to prevent gas leaks. However, the engagement of the crimped portion of the nipple with the cable jacket is seldom continuous, thus leaving openings through which gas from the cable can escape.

The insulated conductors in the unjacketed portion of the stub cable extend from the crimped portion of the nipple through the uncrimped portion, and into the cabinet where they are connected to the terminal posts. The insulated conductors are encapsulated in a plugging compound such as, for example, a thermosetting resin, which generally fills the nipple and thereby engages the inwardly facing surface of the nipple.

Since these cable terminals are usually mounted in the open, they are exposed to temperature cycling which is simulated tests may range from −40° F. to 140° F. The thermosetting resin which encapsulates the individual plastic-insulated conductors where they emerge from the jacketed cable and extend into the housing, and which forms an end dam to prevent the escape of gas from the cable, is characterized by a coefficient of expansion which is substantially different from that of the metal nipple. As a result of the difference in coefficients, the thermosetting resin does not move together with the metal nipple during the temperature cycling, but in cold weather, for example, shrinks more than the nipple. This causes gas leak paths to be formed between the thermosetting resin and the nipple or the jacket, or both, notwithstanding the nipple being crimped about the jacket.

The leakage problem is aggravated by the relatively poor bond between the thermosetting resin and the plastic of which the jacket is made, typically polyethylene, at their interface within the crimped section of the nipple. This leads to the beginning of leak paths, which if not blocked by an effective seal, continue through to the atmosphere. Although the use of polyvinyl chloride (PVC) as a jacketing material would result in a better bond with the thermosetting resin, PVC tends to balloon out under pressure and is not used in gas-pressurized cables.

In the past, where lead jacketing was used, gas leakage was not a problem since the external peripheral edge of the nipple was soldered to the lead jacket of the stub cable. Since the introduction of the plastic jacket, one solution to the problem of gas leakage between the jacket and the nipple has been to run a short length of stub cable, having a lead jacket, between the cable terminal and a splice case wherein it is spliced to a plastic-jacketed cable and to solder the nipple which extends into the cable terminal cabinet to the lead jacket of the stub cable. This is an unsatisfactory solution because of the decreasing availability of lead cable, the complexity of the arrangement, and the undue expense which is involved in the step of soldering.

Solutions to the problem of providing an effective pressurized cable termination seal have been proposed in the prior art. H. Fukutomi, K. Ogawa and J. Egashira in a paper entitled "Prefabricated Pressure Dam for Telephone Cable", which appears on pages 140–144 of the Proceedings of the 20th International Wire and Cable Symposium held on November 30 - Dec. 2, 1971, proposed that a thin pipe of resilient material be placed over a conductor-exposed section of cable after which a plugging compound is injected through a slit in the pipe and cured. In another publication, "Development of Cable with Gas - Stoppage Dam by Polyethylene Mold Process" which was authored by M. Azuma, Y. Oishi, K. Fuse and M. Oda and which appears at pages 312–315 of the Proceedings of the 25th International Wire and Cable Symposium held November 16–18, 1976, the problems of sealing gas pressurized cables are recognized and solved by a process which includes the steps of preheating the cable, injecting a plastic material which is the same as that of the jacket and conductor insulation, pressuring and cooling. This process requires substantial investment in facilities, requires precise control of temperatures, and results in a substantially enlarged cross section in order to withstand the flexing of the cable at its junction with the cabinet.

So far as is known, the prior art in conductor seals does not provide a solution to the problem of preventing gas leakage between a thermosetting resin and an enclosing nipple. U.S. Pat. No. 3,829,546, shows a molded bushing which is sealed to an electrical conductor to prevent leakage between the bushing and the conductor by an elastomeric coating on the bushing and by a coating of a thermosetting epoxy resin which adheres to the bushing, the conductor and the elastomeric material. In U.S. Pat. No. 3,113,284, a conductive sleeve is crimped to a terminal after which an outer casing filled with liquid epoxy resin is disposed about the sleeve and the casing filled with liquid epoxy resin to embed the connector. The treatment of individual conductors as disclosed in either of these patents would result in a cable terminal seal having a large cross section, would be difficult and expensive to install in a multiconductor cable, and further an outer casing made of epoxy resin could not be crimped about the cable jacket.

The known prior art has not addressed itself to the problem of effectively sealing a gas pressurized multiconductor, plastic-jacketed cable at its connection to a cable terminal to prevent gas leakage when subjected to temperature cycling.

SUMMARY OF THE INVENTION

The foregoing problem is solved by a termination seal, which is constructed in accordance with the principles of this invention and which prevents the escape of gas from a length of cable having a plurality of individually insulated conductors and a plastic jacket over a portion of its length. An elastomeric sleeve is disposed about the cable with a first portion of the sleeve overlying and engaging the jacket and with a second portion extending beyond the jacket and enclosing individual insulated conductors of an unjacketed length of cable. A metallic tube has one portion of its length disposed about and in compressive engagement with said first portion of the sleeve which overlies the jacket and the other portion of its length disposed about the second portion of the sleeve and the individual insulated conductors of the unjacketed length of cable. A plugging compound which is compliant with the sleeve material substantially fills the other portion of the tube to encapsulate the conductors and the portion of the sleeve which extends beyond the jacket.

A method of forming an end seal for a cable terminal in accordance with this invention includes the steps of removing the jacket from an end length of the cable to expose the individually insulated conductors, inserting the end length of the cable through a sleeve made of an elastomeric material to engage one end portion of the sleeve with the jacket of a portion of the cable which is adjacent the end length, inserting the sleeve and the end length of cable into a metallic tube with the exposed insulated conductors extending beyond one end of the tube, applying forces to the tube to move it into crimped relation with the sleeve and with the cable jacket, and encapsulating the conductors and other portion of the sleeve with a plugging compound.

The above-described arrangement results in a seal which on the cable side comprises the metallic tube being in compressive engagement with the sleeve and with the cable jacket. On the terminal side, the seal comprises an extension of the sleeve and the individually insulated conductors being encapsulated in the plugging compound such as, for example, a cured epoxy resin which is compliant with the sleeve.

BRIEF DESCRIPTION OF THE DRAWINGS

Other features of the present invention will be more readily understood from the following detailed description of specific embodiments thereof, when read in conjunction with the accompanying drawings, in which:

FIG. 1 is a perspective view of a pressurized cable termination seal which is constructed in accordance with this invention;

FIG. 2 is a perspective view of a length of cable which extends along a telephone pole and which is terminated with a cable seal shown in FIG. 1 and attached to a terminal cabinet;

FIG. 3 is an exploded perspective view of the end seal shown in FIG. 1;

FIG. 4 is an enlarged elevational view in section taken longitudinally of the cable seal in FIG. 1 in an intermediate stage of construction;

FIG. 5 is a view of the cable seal shown in FIG. 4 at a subsequent stage in assembly; and FIG. 6 is another embodiment of the final stage of assembly of the seal shown in FIG. 4.

DETAILED DESCRIPTION

Referring now to FIGS. 1 and 2, there is shown pressurized cable termination seal, designated generally by the numeral 10, for use in a distribution system which carries telephone service from an aerial cable 11 to subscribers' premises. A short length of stub cable 12 having a plurality of insulated conductors 13—13 is connected to the aerial cable 11 in a splice case 14 and is connected to a cable terminal, designated generally by the numeral 16. The cable terminal 16 includes a terminal block 17 made for example from a molded plastic shell in which are mounted a plurality of terminals 18—18 and associated protector devices 19—19 that are encapsulated with a polyester material. The stub cable 12 is connected to the terminal block 17 with an unjacketed length of the individual conductors 13—13 being embedded in the polyester material and connected to the terminals 18—18. The terminal block 17 is mounted in a cabinet 20 which has a plurality of access openings 21—21 for receiving drop wires 22—22 which are strung between the cable terminal 16 and subscribers' premises. The drop wires 22—22 are connected to ones of the terminals 18—18 to complete the connections between the subscribers' premises and the aerial cable 11. It is customary to assemble the length of stub cable 12 and the cable terminal 16 in a manufacturing plant.

As should be evident, the cable terminals 16—16 are exposed to the environment which means that they are subject to temperature cycling which insimulated tests may include a range with end points as much as 100° F. apart. This presents no special problems except in those installations in which the stub cable 12 is spliced to pulp-insulated conductor cable. In those installations, precautions must be taken to avoid the ingress of moisture which could be absorbed rather than rejected by the conductors. This is accomplished by gas pressurizing the distribution system up to the cable terminal 16 which means that the connection of the stub cable 12 to the terminal block 17 must be provided with a seal which is effective to prevent gas leaks from the cable system notwithstanding the temperature cycling. A sealing arrangement which is constructed in accordance with the principles of this invention maintains gas pressure within the cable 11 by generally preventing the development of gas leakage paths and by increasing substantially the length of any leakage path which may develop. Sealing arrangements may also be required where pressurized cables enter other kinds of housings, such as, repeater or carrier cases.

Viewing now FIG. 3, there is shown an exploded view of the pressurized cable termination seal 10, which embodies the principles of this invention and which is assembled to an end portion of a stub cable 12. The stub cable 12 includes a core 31, having a plurality of insulated conductors 13—13, a shield 33, which is made of a metallic material such as, for example, aluminum, and a jacket 34 of a plastic material, which is generally polyethylene. The jacket 34 and the shield 33 are removed from an end section of the stub cable 12 so that the insulated conductors 13—13 are carried through the seal 10 and are connected to the terminals 18—18 in the cabinet 20.

In order to effectively prevent the escape of gas from the cable 12, the seal 10 includes a sleeve or bushing 41

(see FIG. 4) made of an elastomeric material. By elastomeric material is meant a rubber-like or a flexible and resilient material, such as, for example, an ethylene propylene diene monomer (EPDM) which is a terpolymer of ethylene, propylene and a third monomer that is polymerized with the ethylene and the propylene. The elastomeric material from which the sleeve is made must have outstanding weathering properties and must be capable of being molded in relatively thick or thin sections. In a preferred embodiment, a sleeve 41 made from an EPDM material, which is available commercially from Mechanical Rubber Products, Inc. of Norwalk, New York, has a large diameter, thick wall portion 42 and a small diameter, thin wall portion 43 with an inner annular shoulder 44 and with an outer annular shoulder 46 formed therebetween (see FIG. 4).

The sleeve 41 is positioned on the end portion of the stub cable 12 so that the peripheral face of an end section 47 of the jacket 34 engages the inner shoulder 44 of the sleeve 41. In this way the portion 42 of the sleeve 41 on the cable side of the seal 10 is in engagement with the end section 47 of the jacket 34, and the exposed, insulated conductors 13—13 extend through the end portion 43 of the sleeve on the terminal side of the seal. A sealing compound, such as, for example, Scotch Grip ® adhesive, which is available from the 3M Company, may be coated on the inner surface of the portion 40 of the nipple and the end section 46 of a jacket made of a material which may not have a smooth finish.

The cable 12 is provided with a metallic tube or nipple 36, which is typically constructed of brass (see FIG. 4). The nipple 36 is designed to receive the end section of the cable 12 with the conductors which are to be connected to the terminals 17—17 and the sleeve 41 disposed thereabout. As can best be seen in FIG. 3, the nipple 36 is knurled or formed with a plurality of outer rings 37—37 on a cable terminal end 38 thereof in order to anchor the nipple within the polyester block 17 and connect mechanically the seal 10 and the cable terminal 16. The nipple 36 is also provided with an inner annular shoulder 39 which is in engagement with the outer shoulder 46 of the sleeve 41 and is effective to limit the insertion of the sleeved, jacketed section of the cable 12 to thereby align it with a cable side portion 40 of the nipple. In order to connect the seal 10 to the cabinet 20, the terminal end 38 of the nipple 36 which extends substantially beyond the terminal end 43 of the sleeve 41 is received in a rubber grommet 48 (see FIGS. 2 and 5) which is mounted in an opening 49 in the cabinet 20 and which functions as a seal to prevent the ingress of moisture into the cabinet 20.

As can be seen in FIG. 5, in order to effectively seal the cable end of the assembly 10, the cable end portion 40 of the nipple 36 is crimped or swaged by moving the nipple into compressive engagement with the portion 42 of the sleeve and with the end section 47 of the cable jacket 34. The crimping results in a cable diameter which is reduced by about 10 to 12% and in a reduced nipple diameter portion 45 on the cable end of the seal 10, and also acts to prevent the escape of gas from the terminal end of the seal toward the jacketed cable 12 at the interfaces between the cable jacket 34 and the sleeve 41 and between the sleeve and the jacket 34.

Considering now the terminal end of the seal 10, the insulated conductors 13—13 are encapsulated in a plugging compound 51 which typically is a thermosetting resin. While an epoxy resin reaction mixture which is fully cured is preferred as the plugging compound, other suitable thermosetting resins such as, for example, polyurethanes may be used. In a preferred embodiment, the epoxy resin reaction mixture comprises 100 parts by weight of a composition which includes nine parts of a catalyst such as, for example, dimethylaminol methyl phenol, DMP-30 available from Rohm and Haas Chemical Co. and 91 parts of polysulphide such as, for example, LP-3 available from Thiokol Chemical Co., and 100 parts by weight of an epoxy resin such as EPON ®828 available from Shell Chemical Corp. The nipple 36 advantageously functions as a mold for the plugging compound 51. Although it may seem advantageous to use the polyester material which comprises the terminal block 17 for purposes of the seal, the polyester material, unlike the epoxy resin, would not wet the conductors 13—13 and instead would form loose-fitting tubes about the conductors.

It is seen from FIGS. 4 and 5 that the terminal end 43 of the sleeve 41 extends beyond the crimped portion of the nipple 36 and into the mass of plugging compound 51. The extension of the sleeve 41 cooperates with the plugging compound 51 into which it extends to prevent the escape of gas from the pressurized cable 12. The sleeve 41 which is constructed of an elastomeric material, such as, for example an ethylene-propylene diene monomer, is compliant with the epoxy resin. As a result, the sleeve end 43 moves with the plugging compound 51 during the temperature cycling thereby avoiding the development of temperature-induced stress cracks which would allow the escape of gas from the cable 11 around the end of the sleeve 41 and back out toward the cable end of the seal 10.

The second way in which the sleeve 41 functions to prevent the escape of gas is by increasing substantially the length of any leak path that may develop. It should be apparent that any gas, in order to escape, must travel from the cable 12 along the sleeve 41 well into the plugging compound 51 and then back along the outwardly facing surface of the sleeve and between the nipple 36 and the jacket 34.

It may also be observed from FIGS. 4 and 5, that the cross-sectional thickness of the sleeve 41 is not uniform and that the thickness of the portion 43 which is engagement with the plugging compound 51 is substantially less than that of section 42 which is pressure-sealed between the cable jacket 34 and the brass nipple 36. This reduction in thickness of the sleeve 41 further improves the ability of this seal to prevent the escape of gas from the cable. Should a leak path develop along the inwardly facing surface of the cable jacket 34 and then along the inwardly facing surface of the sleeve 41, the pressurized gas from the cable 12 imparts forces radially outwardly in engagement with the thinned out cross-section of the sleeve portion 43 to urge it into a tightly fitted abutment with the plugging compound 51. This effectively seals the outside of the sleeve 41 in engagement with the plugging compound 51 and prevents the escape of gas from the cable. If the thicker cross-section of the sleeve 41 extended into the plugging compound 51, it could not be moved by the gas pressure into compressive engagement with the plugging compound. This is especially true at low temperatures when the sleeve material becomes very rigid and difficult to deform.

In those instances where the pressure is relatively low, and is incapable of causing movement or compression of the sleeve 41, the length of any leak path around the protruding end of the sleeve reduces the leakage.

Further, the pressure seal created by the crimped nipple 36 in engagement with the thickened portion of the sleeve 41 and the polyethylene jacket 34 supplements the lengthy path in the reduction or the prevention of gas leakage.

With this arrangement, the development of openings at the interface of the plugging compound 51 with the metal nipple 36 are not generally detrimental to the effectiveness of the seal 10. The metallic nipple 36 has a coefficient of expansion of $10.5 \times 10^{-6}$ in/in/° F. which is substantially higher than the coefficient of $33.3 \times 10^{-6}$ in/in/° F. for the plugging compound 51. If any of the plugging compound at the interface would adhere to the metal, temperature cycling would cause a portion of the mass of the plugging compound to separate from the remainder and cracks could develop. It is not inconceivable that this could cause a splitting of the cable 12 along its centerline. In order to avoid this, in a preferred embodiment of this invention, the inwardly facing surface of the uncrimped portion 38 of the nipple 36 is coated with a release agent such as, for example, No. 1 cut, Parks white shellac manufactured by Parks Corp. of Somerset, Mass.. This prevents the bonding of the plugging compound 51 to the metal nipple 36 and avoids the development of stress cracks adjacent thereto.

In a preferred embodiment shown in FIG. 6, the cable end of the seal 10 is provided with an additional safeguard to prevent the escape of any gas that flows along a leak path that may possibly develop. The tube 36 is further crimped or swaged about the cable 12 to form a further reduced portion 56. This further reduction in cross-section and accompanying additional pressure exerted on the sleeve 41 and cable jacket further reduces the possibility for any gas leaks out of the cable end of the seal 10. It has been found that in the preferred embodiment, the nipple 36 is further crimped to reduce the diameter by about 10 to 12%. It may also be desirable to provide a nipple 36 having an initially reduced section 57 (see FIGS. 5 and 6) so that when the nipple is crimped, the section 57 prevents any extrusion of the cable jacket 34 out from the seal 10.

In a method of making the cable end seal 10, an assembler strips the jacket 34 from an end section of a length of the stub cable 12 to expose the individually insulated conductors 13—13. Then the assembler inserts the end portion of the cable 12 through a sleeve 41 until the inner shoulder 44 of the sleeve is in engagement with the jacket 34. The sleeve 41 and the end section of the cable 12 are inserted into the nipple 36 until the outer shoulder 46 of the sleeve engages the shoulder 39 of the nipple. The assembler separates the conductors 13—13 which extend through the terminal end 38 of the nipple 36, an inner portion of which has been coated with a release agent such as shellac, and applies force to the external side 40 of the nipple 36 to crimp it against the sleeve. The initial crimping of the nipple 36 is accomplished to achieve a reduction in nipple diameter of about 10 to 12% which avoids any buckling of the cable jacket 34 or shield 33. The assembler fills the terminal end 38 of the nipple 36 with a plugging compound 51 to encapsulate the insulated conductors 13—13 and the terminal end 44 of the sleeve 41 and cures the compound. Additional compound may then be poured into the nipple 36 and cured to refill any of the terminal end portion of the sleeve which may have been vacated by the compound during the initial cure. Then the assembler applies forces to the nipple 36 to further reduce the diameter of the terminal end 40 by about 10 to 12%. The filling of the end of the nipple 36 with the plugging compound results in some of it flowing into the interstices between the insulated conductors 13—13 in the jacketed section of the cable 12. This advantageously provides a somewhat rigid backing against which the second crimping operation is performed to avoid any buckling of the cable shield 33.

Then the assembler connects the conductors 13—13 to associated ones of the terminals 18—18 which are supported in a mold together with the protectors 19—19. A ground strap assembly 61 (see FIGS. 1 and 6) having a clip 62 is connected to the cable shield 33 and run lengthwise of the terminal block 17 with all protector units 19—19 soldered thereto. Then the assembler inserts a rubber grommet 48 into the opening 49 of a cabinet 20 and inserts the free end of the stub cable 12 through the grommet. The assembler pulls the cable 12 through the grommet 48 until the nipple 36 is seated within the grommet and connects a free end of a ground bar or wire 63 to the opposite end of the cabinet. It should be understood that while the ground strap assembly 61 is shown only in FIGS. 1 and 6, it is used with the seal 10 in FIGS. 4 and 5, for example, but has been omitted in those figures for purposes of clarity.

EXAMPLE

In a cable seal 10 which is manufactured in accordance with this invention, the jacket 34 is removed from one end portion of the stub cable 12 to expose the individually insulated conductors 13—13. The unjacketed end portion of the cable 12 extends through a sleeve 41 having an outside diameter of 0.65 inch, an inside diameter of 0.49 inch on its cable end 44 and an overall length of 1.60 inches with the beginning of the jacket aligned with the beginning of the necked down portion of the sleeve. The terminal end 43 of sleeve 41 has a reduced section 0.62 inch long having an outside diameter of 0.49 inch, an inside diameter of 0.43 inch. A grounding strap assembly 61 is attached to the cable 12 with the ground clip 62 of the grounding strip assembly 61 attached to the corrugated shield 33 of the cable 12.

The sleeve 41 with the end portion of the cable 12 extending therethrough is received in a nipple 36 which is made from grade B brass rod that has been plated first with 0.0002 inch thick copper and then with 0.0002 inch of solder and which has been precoated with shellac along the inner surface of the terminal end 38. The nipple 36 has an overall length of about 2.25 inches, and is formed with a plurality of rings 37—37 at the terminal side thereof. The outermost ring 37 has a width of about 0.041 inch with an overall diameter of about 0.875 inch while the outside diameter of the unringed portion of the nipple itself is 0.756 inch and the inside diameter is 0.656 inch. Four additional rings 0.031 inch wide are also formed on this end of the nipple. The cable side of the nipple 36 is about 1.00 inch long, has an inner diameter of 0.770 inch and an outside diameter of 0.870 inch. The inner ring 38 has a clearance diameter of 0.45 inch with the walls thereof being at an angle of 60° to the centerline of the nipple 36. The entrance end to the cable side of the nipple 36 is beveled to permit easy entrance of the cable 12.

The final configuration of the nipple 36 in a preferred embodiment is shown in FIG. 6. The initially crimped portion 45 is reduced about 12% over the uncrimped diameter of the cable end 40 of the nipple, while the second crimped portion 56 is reduced by about 12% over that of the initially crimped portion. This results in the final crimped portion having a diameter which has been reduced from its initial diameter by about 25%. Of course, as will be recalled, the two stage crimping process is interrupted after the initial reduction in diameter in order to fill the terminal end 38 of the nipple 36 with the plugging compound 51.

The plugging compound 51 is the reaction product of an epoxy resin reaction mixture comprising 100 parts by weight of EPON ®828 epoxy resin, 91 parts by weight of LP-3 Flexicisor and 9 parts by weight of DMP-30 which has been fully cured in an oven at a temperature of about 200° F. for a period of 20 minutes. The plugging compound 51 encapsulates the exposed insulated conductors 13—13 and the reduced diameter end 47 of the sleeve 41.

The nippled end of the stub cable 12 extends through a mold 66 (see FIG. 6) made of ABS plastic material in which are positioned an array of the terminals 18—18 and associated protectors 19—19. The individual conductors 13—13 are connected to the associated terminals 18—18 and the protectors 19—19 are connected to the grounding bar 63 which extends from the ground clip 62 through the mold. The mold 66 is filled with a polyester material to form the terminal block 17, and to encapsulate the individual conductors 13—13, portions of the terminals 18—18 and portions of the protectors 19—19. The polyester material which includes for example, a composition of a styrene polyester resin which is available commerically, for example, from PPG Industries, is cured for about one hour at an average temperature of 160° F. The knurled portion of the nipple 36 is embedded in the polyester to anchor the nipple therein. The cabinet 20 in one example of an 8'-0" stub cable 12 has an overall length of about 17.875 inches and an overall width of about 2.0 inches.

The cable side of the cable 12 which has been inserted through the grommeted opening 48 in the cabinet 20 has been pulled through the opening 49 until the nipple 36 is positioned in the opening so that the wall of the opening is slightly to one side of the knurled portion of the nipple (see FIG. 6). In order to complete the assembly of the cable terminal 16, the free end of the ground strap assembly bar 63 is connected to the opposite end of the cabinet.

It is to be understood that the above-described arrangements are simply illustrative of the invention. Other arrangements may be devised by those skilled in the art which will embody the principles of the invention and fall within the spirit and scope thereof.

What is claimed is:

1. A seal for a length of cable having a plurality of individually insulated conductors and a plastic jacket over a portion of its length, said seal comprising:
    an elastomeric sleeve which is disposed about the cable with a first portion of the sleeve overlying and engaging the jacket and with a second portion extending beyond the jacket and enclosing individual insulated conductors of an unjacketed length of cable;
    a metallic tube having one portion of its length disposed about and in compressive engagement with said first portion of the sleeve that overlies the jacket and the other portion of its length being disposed about the second portion of the sleeve and the individual insulated conductors of the unjacketed length of cable; and
    a plugging compound which is compliant with the sleeve and which substantially fills said other portion of the tube to encapsulate the individual insulated conductors and the portion of the sleeve that extends beyond the jacket.

2. The seal of claim 1, wherein an inwardly facing surface of the other portion of the metallic tube is coated with a release agent to prevent the formation of a bond between the tube and the plugging compound.

3. The seal of claim 1, wherein the cable is pressurized with a gas and the sleeve extends into the plugging compound a distance which is sufficient to lengthen substantially any leakage path of the gas from the cable around the sleeve.

4. The seal of claim 1, wherein the plugging compound is a cured thermosetting resin.

5. The seal of claim 4, wherein the cured thermosetting resin is a cured epoxy resin.

6. The seal of claim 1, wherein the tube has a ring protruding radially inwardly from an inwardly facing surface of the tube adjacent the jacketed length of the cable, said sleeve being in engagement with said protruding ring, and the portion of the sleeve which is disposed about the unjacketed length of the cable has a smaller thickness than that in engagement with the jacket and in engagement with the protruding ring.

7. The seal of claim 1, wherein the one portion of the tube in engagement with the first portion of the sleeve includes a section which is reduced in diameter and another section contiguous thereto which is further reduced in diameter.

8. A cable having a seal which comprises:
    a core having a plurality of individually insulated conductors;
    a plastic jacket which covers a portion of the length of the core;
    an elastomeric sleeve disposed about the core with a first portion of the sleeve in engagement with the jacket and with a second portion extending beyond the jacketed length of the core and enclosing an unjacketed length of the core;
    a metallic tube having one portion of its length disposed about and in compressive engagement with said first portion of the sleeve and the jacket, and the other portion of its length being disposed about the individual conductors of the unjacketed length of the core; and
    a plugging compound which is compliant with the sleeve and which generally fills the other portion of the tube to encapsulate the individual conductors and said second portion of the sleeve which extends beyond the jacket.

9. A method of sealing a cable having a core, which includes a plurality of individually insulated conductors, and a plastic jacket, which includes the steps of:
    removing the plastic jacket from an end length of the cable to expose the individually insulated conductors;
    moving a sleeve which is made of an elastomeric material over the cable and positioning it so that a first portion thereof is in engagement with the jacket and so that a second portion extends over the individual insulated conductors of the end length of the cable from which the jacket has been removed;
    moving a metallic tube over the sleeve so that one end portion of the tube is disposed about the first portion of the sleeve and the jacket and the other end portion of the tube is disposed about the second portion of the sleeve and the individual insulated conductors;

applying forces to the one end portion of the tube to reduce its diameter and to move the tube into compressive engagement with the first portion of the sleeve and the cable jacket; and filling the other end portion of the tube with a plugging compound which is compliant with the sleeve to encapsulate the individual conductors and the second portion of the sleeve.

10. The method of claim 9, wherein the method also includes the step of applying further forces to the one end portion of the tube which is disposed about the sleeve and the jacket subsequent to the step of filling the other end portion of the tube with plugging compound.

* * * * *